April 30, 1963   J. TANENBAUM   3,087,744
LONG LOAD VEHICLE
Filed Oct. 26, 1960   3 Sheets-Sheet 2
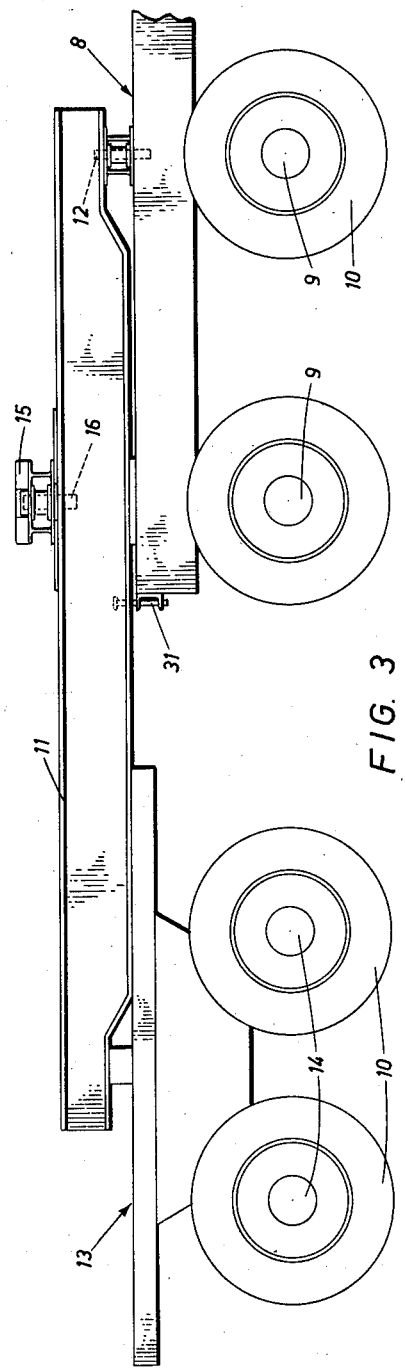
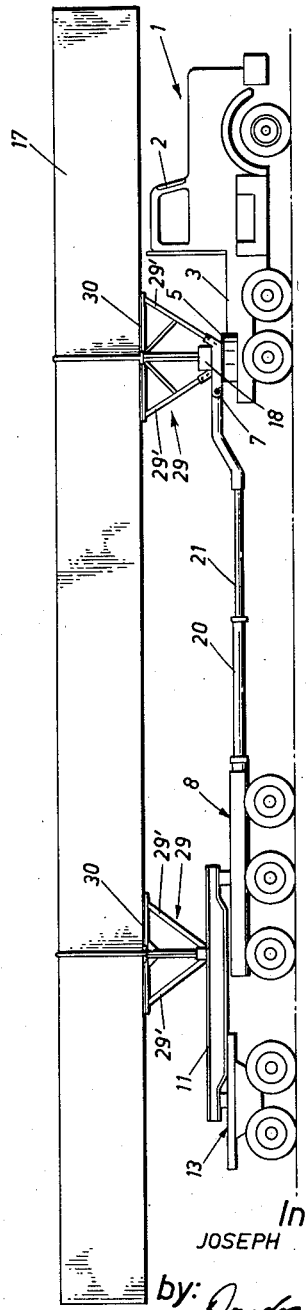
Inventor
JOSEPH TANENBAUM
by:
                Attorney April 30, 1963   J. TANENBAUM   3,087,744
LONG LOAD VEHICLE Filed Oct. 26, 1960   3 Sheets-Sheet 3

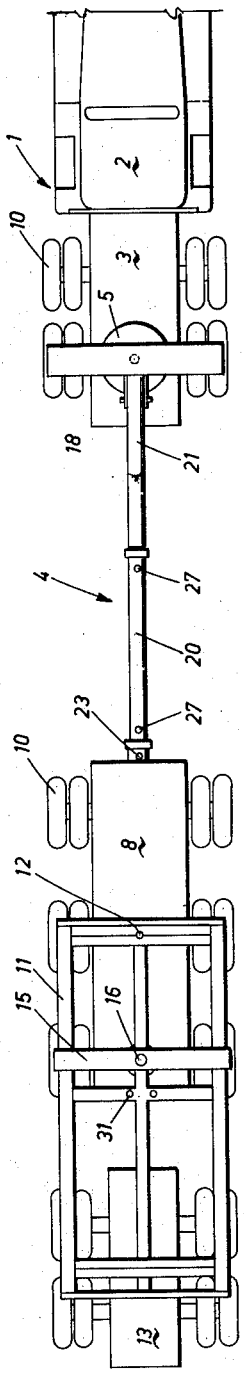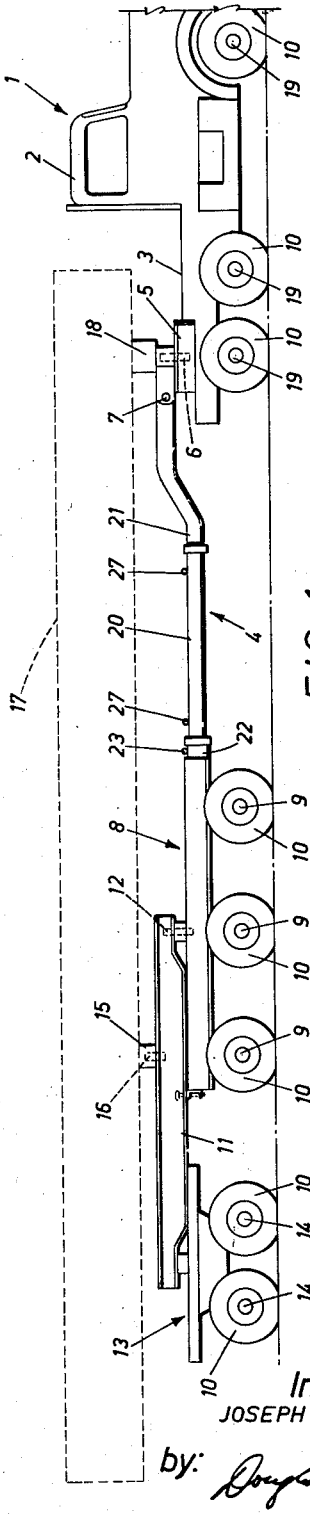

Inventor
JOSEPH TANENBAUM by: *Douglas S. Johnson*
Attorney

United States Patent Office 3,087,744
Patented Apr. 30, 1963

3,087,744
LONG LOAD VEHICLE
Joseph Tanenbaum, 222 Lonsmount Drive,
Toronto, Ontario, Canada
Filed Oct. 26, 1960, Ser. No. 65,112
15 Claims. (Cl. 280—404)

This invention relates to improvements in long load vehicles of the tractor-trailer type such as are employed in the hauling of long lengths of steel, beams, girders and the like.

In the transportation of structural materials such as lengths of steel, beams, girders, pipes and the like, the lengths which, up to the present, have been permitted on the roads and highways have seriously limited the construction industry requiring a great deal of structural fabrication on the job site adding enormously to the building costs.

The limitations which are imposed on the length of steel or other material which can be transported stems from a number of factors. For instance, there is the obvious problem of handling or turning the tractor-trailer with a long load and this long load handling has been a major limitation.

Again, in the case of long loads, such loads often cannot be carried on conventional tractor-trailers because they cannot be supported in transport free from excessive bending stresses providing another serious limitation.

In addition to the above limitations placed on the length of the load, the weight which can be carried is also limited due to the fact that the limited turning and handling capabilities of present tractor-trailers prevents any use of additional load supporting dolly or trailer units to be connected in the tractor-trailer train for supporting heavier loads.

It is the object of the present invention to provide a tractor-trailer combination which will enable both substantially longer and substantially heavier loads to be hauled on presently existing highways and roads.

In this connection, it is the object to enable such longer or heavier loads to be carried while at the same time affording a degree of tractor-trailer manoeuvrability such as will not only be acceptable to the transport licensing authorities for highway transport, but will enable the driver to readily handle the truck at all times from pick-up to delivery.

Another of the problems in carrying loads of either great length or weight is the wear occasioned on the tires particularly if there is overloading of any particular tire or tire set, or if, in turning, excessive skidding of the tires occurs. It is a further object of the present invention to enable the loading of the tires to be balanced and to reduce tire skidding to a minimum even on the longest and heaviest loads, whereby important savings in tires will be achieved and there will be fewer delays due to tire changes.

The principal feature of the invention resides in providing a tractor-trailer arrangement which will permit a load overhang such as to enable the load to be carried with a minimum distance between the tractor and the trailer assembly; that is, with a minimum actual vehicle length.

According to one aspect of the invention, an overhang of the load both at the front and the rear of the vehicle is afforded by means of a trestle arrangement on both the tractor and the trailer assembly, the trestle arrangement supporting the load above the vehicle cab so that it can project forwardly of the vehicle cab.

According to another aspect of the invention there is provided a novel trailer assembly which will permit an extended load overhang at the rear without overloading of the trailer axles or tires or restricting vehicle manoeuvrability.

In this latter connection, the trailer assembly comprises a novel load supporting carrier having its front end overlying and swivelled to a first trailer fixed to a longitudinal body or tongue structure swivelly connected to the tractor and having its rearward end supported by a second trailer, the carrier being provided with a load receiving bearing structure swivelled thereon intermediately of its length.

Preferably the first trailer comprises a three-axle trailer fixed to the longitudinal, preferably telescopic, body structure and the second trailer comprises a two-axle trailer fixed to the carrier and the carrier's load receiving bearing structure is located so that when the trailers are in line and the load bearing structure is arranged to extend transversely of the trailers, it overlies the last axle of the first trailer.

These and other objects and features will become apparent from the following disclosure taken in conjunction with the accompanying drawings, in which:

FIGURE 1 is a side elevational view of a long load vehicle embodying the invention;

FIGURE 2 is a plan view of the vehicle of FIGURE 1;

FIGURE 3 is an enlarged, broken away, side elevational view of the carrier and its supporting trailer structures;

FIGURE 4 is a view similar to FIGURE 1 but showing the vehicle provided with trestles for supporting the load to overhang the cab and rear trailer and showing the extensible body of the vehicle extended to its maximum length;

Figure 6:
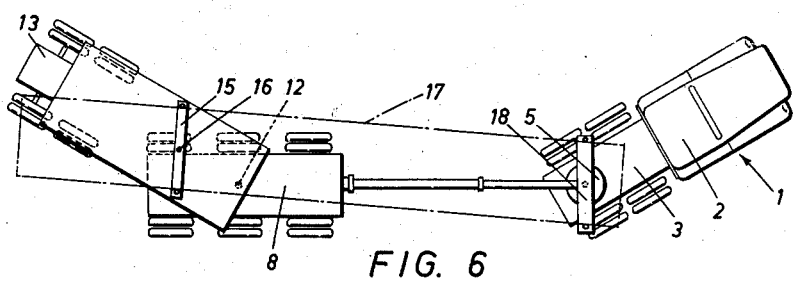
FIGURE 6 is a plan view illustrating the turning capabilities of the vehicle.

With reference first to FIGURES 1 and 2, it will be seen that the vehicle comprises a tractor, generally designated at 1, having a cab 2 and a body portion 3.

The body of the vehicle, generally designated at 4, is extensible as hereinafter described and is secured at its forward end to a turntable 5 mounted on the tractor body 3 so that the vehicle body 4 can swivel relative to the tractor about the pin 6. The vehicle body 4 is also jointed as at 7 so that in addition to being arranged to swivel about the vertical axis of the pin 6, it is also free to pivot about the horizontal axis 7.

The rear of the vehicle body 4 is secured to a first trailer 8 which preferably is a three-axle trailer having three axles 9 supporting three sets of rubber tired wheels 10.

A carrier 11 is disposed with its front end overlying the first trailer 8 and being swivelly connected thereto by means of a pin 12, the point of swivel being centrally of the width of the trailer 8 and substantially above the middle axle 9.

The rear of the carrier 11 is supported by a second trailer 13 and this trailer is rigidly fixed to the carrier and preferably comprises a two-axle trailer having a pair of axles 14 supporting sets of rubber-tired wheels 10.

Mounted on the carrier 11 is a load-bearing beam 15 which is swivelly supported as by means of a pin 16 at a point centrally of the width of the carrier 11 and substantially immediately over the last axle 9 of the first trailer 8, thus as seen in FIGURE 2 with the first trailer 8 and second trailer 13 in alignment and the load-bearing beam 15 extending transversely of the carrier 11, the beam will be substantially vertically aligned with the rear axle 9 and a load 17 placed thereon will be distributed evenly over the wheel 10 of the last axle of the first trailer and the wheels carried by the two forward axles of the first rear trailer and the wheels carried by the two axles of the rear trailer.

The front of the load 17 is supported on a load-bearing beam 18 which is fixed to the forward end of the vehicle body 4 to swivel therewith being vertically aligned with the pin 6 and the rear axle 19 of the tractor 1, the tractor being supported on 3 such axles and the sets of wheels 10 similar to the wheels provided on the trailers.

Figure 7:
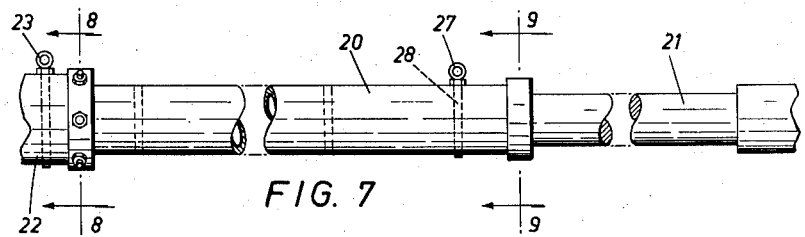
FIGURE 7 is an enlarged, broken away, side elevational view of the extensible body of the vehicle.
Figure 8:
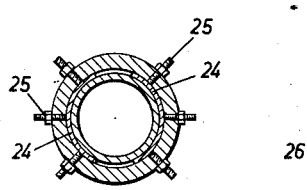
FIGURE 8 is a vertical sectional detail on the line 8—8 of FIGURE 7.
Figure 9:
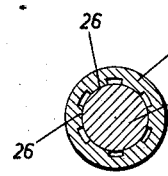
FIGURE 9 is a vertical sectional detail on the line 9—9 of FIGURE 7.
Figure 5A:
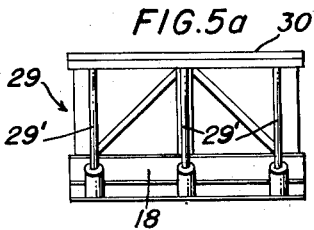
FIGURE 5a is an elevational view of the trestle shown in FIGURE 5 looking in the direction of the arrows 5a—5a of FIGURE 5.

As shown in FIGURES 7 to 9, the vehicle body 4 comprises a tubular section 20 and a bar or post section 21 which telescopically engages in the tube or pipe 20.

The forward end of the first trailer 8 is provided with a tubular projection 22 and the end of the tubular section 20 is adapted to be sleeved into the tubular projection 22 and to be secured therein by means of a pin 23 passing through suitable registering openings in the tubes 20 and 22 and additionally by tube clamps 24 actuated by screw-threaded clamping member 25.

At its forward end, the tubular section 20 is provided with internal guiding lugs 26 for centering the bar or post member 21 and the tube 20 and bar 21 are locked in the desired position by means of one or more pins 27 corresponding to the pin 23 selectively located in registering openings in the tube 20 and through the bar 21 as indicated at 28.

As a safety feature, a chain, not shown, may also be used to connect the first trailer 8 to the tractor 1 to take the tensional load and prevent drop off of the trailer should one of the pins 23 or 27 be ruptured.

By the provision of the arrangement of the carrier 11 swivelled to the first three-axle trailer 8 and supported by the second two-axle trailer 13, there is presented at the rear of the vehicle a five-axle load-carrying system which will enable a major portion of the load 17, FIGURE 1, to be supported by the rear trailer carrier assembly. This fact enables the load to be given a substantial overhang at the rear, or in other words, enables the rear carrier-trailer assembly to be moved up closer to the tractor 1, it being understood that the provision of the telescopic body structure 4 of the vehicle permits this adjustment of the spacing between the tractor 1 and the carrier-trailer or trailer assembly.

It will also be understood that the manoeuvrability or turning capabilities of the vehicle will increase as the length of the vehicle decreases. In this connection, if the five axles necessary to carry the loading on the trailer assembly to allow the rear trailer to be moved towards the tractor were on a single fixed trailer, there would be excessive skidding of the tires around even the slightest curve providing destructive wear on the tires and the turning capabilities of the vehicle would be unacceptable. However, by the provision of the carrier, swivelled at its forward end and carrying the swivelly mounted load-bearing member 15, the second trailer 13 can assume an angular position relative to the first trailer 8, as illustrated in FIGURE 6, to allow the vehicle a sufficiently short turning radius that it can be readily handled at all times, even when the extensible body 4 is extended to its full length.

In this connection, looking at FIGURE 6, it will be seen that the load 17 lies within the right-hand set of wheels on the axles 9 of the first trailer and the left-hand set of wheels on the axles 14 of the second trailer and again the point of support for the load as afforded by the load-bearing beam 15 is substantially mid-way between the first axle 9 and the last axle 19. Thus the load is balanced at all times so that there is no tipping moment on the vehicle and the load is substantially evenly distributed between the axles even on turns.

By putting the three axles on the first trailer, there will be three sets of wheels where forces on the tires are maximum during turning, whereas there is relatively little skidding action on the tires of the rear trailer and two sets of tires are adequate from this standpoint on the rear trailer.

Figure 5:
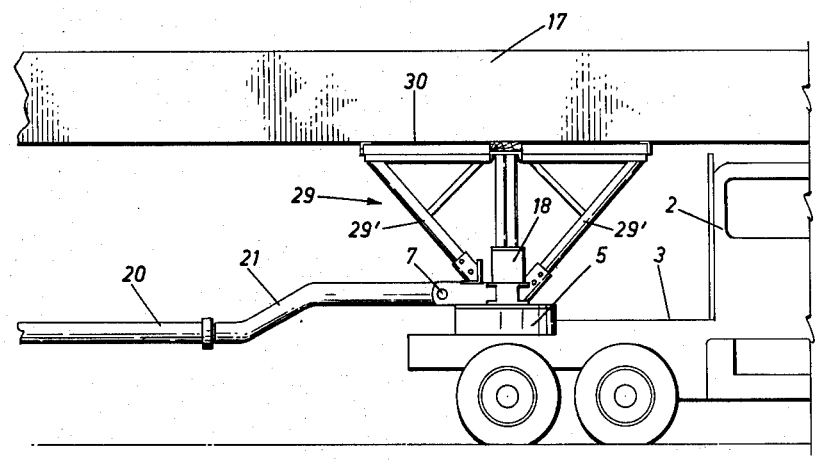
FIGURE 5 is an enlarged, broken away, elevational view showing details of the forward trestle mounted on the tractor body.

In normal operation, the vehicle body 4 is telescoped to provide the desired turning capacity on the vehicle and the load is arranged to have an extended overhang at the rear as permitted by the five-axle system comprised by the carrier 11 and first and second trailers 8 and 13 respectively.

Where the load provides too great an overhang at the rear or there is a disproportionate amount of loading placed on the five axles of the carrier-trailer system in relation to the loading on the tractor axles or where with only an overhang at the rear the spacing between the tractor and the trailer assembly is too great for proper vehicle manoeuvrability, trestle structures, generally designated at 29, are mounted on the load-bearing beams 15 and 18 as shown in FIGURES 4 and 5. These trestles provide broad bearing platforms 30 at the top thereof which extend above the top of the tractor cab 2. With this arrangement, the load 17 can be supported on the trestles so that its forward end overhangs the cab 2 of the tractor, enabling the axles of the tractor to be loaded to their permissible extent.

The trestles are made extremely strong by means of the provision of diagonal bracing 29' which extends diagonally downwardly from the front and rear of the wide platform 30 to the trestle base to provide rigid support from the tractor or rear trailer assembly, as the case may be, up to the opposite sides of the platform 30. With this construction it has been found that the load can be supported as solidly above the cab as when carried directly on the tractor and trailer assembly. This arrangement is extremely important as without such bracing 29' and the solid support afforded thereby the load would be a serious source of danger to the driver and other traffic as it would tend to topple the trestle under braking or other deviations in vehicle speed.

Thus, with the trestles 29 illustrated, the driver can freely manoeuvre his truck in normal traffic without having to resort to gentle braking, excessively low speeds or rate of acceleration so that even with the load overhanging the front as well as the rear of the truck the driver can brake as sharply as though he were driving an ordinary vehicle.

With the arrangement shown the five-axle system of the trailer assembly at the rear provides for an extended overhang of the load at the rear with the loading still within the safe limits that can be handled by the five-axle system due to the balancing of the load through its location above the central axle.

In addition to the fact that the five-axle system allows heavy loading at the rear of the vehicle with a long overhang which will balance the length of the load extending between the points of support on the rear carrier-trailer assembly and the tractor, the provision of the trestles 29 supporting the load above the cab of the tractor will minimize the interference of the load with traffic since it will be appreciated that any vehicle that is not higher than the cab of the tractor 1 can run up beneath the load without danger and the length of vehicle to be passed in traffic will be the length between the carrier-trailer system and the tractor and not the full length of the load. In practice, all vehicles other than large vans will be able to move freely beneath the overhanging load In the case of, for instance, light steel, where bending is a problem during transport or where the load is extremely long and would otherwise require an impractical vehicle length, it will be appreciated that the load can be mounted on the trestles 29 to have an overhang at the front and the rear and the telescopic body 4 can be adjusted so that the points of support of the load will provide a substantially balanced length of load on each side of each point of support to prevent excessive bending stresses on the load and to allow the spacing of the tractor and trailer assembly to be reduced to a distance acceptable for vehicle manoeuvrability. With the trestle having a wide platform 30, it will be understood that there will be adequate support to prevent overturning of the trestles, for instance, on braking of the vehicle.

In the matter of turning the vehicle, it should be emphasized as previously explained that the length of the vehicle governing turning will be the distance between the front of the tractor and the rear of the trailer-carrier assembly. Thus, by having overhangs at the front and rear, as shown in FIGURE 4, extremely long loads can be hauled without excessive vehicle length between the tractor and trailer assembly. It will be apparent that the use of the trestles to support the load so that it can be projected beyond the front of the vehicle as well as beyond the rear of the vehicle gives an arrangement allowing lengths of loads to be carried on the roads which previously had been deemed impossible.

It will be understood that when it is desired to back the vehicle up in a straight line, all of the wheels on the trailers 8 and 13 will be required to be in line so that the operator from the cab will have the proper control of the truck. In this connection, it will be understood that the carrier 11 can be temporarily locked in aligned position with the first trailer 8 as, for instance, by means of locking pins 31.

While a specific embodiment of the invention has been illustrated and described, it will be understood that variations in the details of construction and arrangement may be made by those skilled in the art within the spirit of the invention and without departing from the scope of the appended claims.

What I claim is:

1. A long load vehicle comprising a tractor having a cab, a longitudinal body structure swivelled at its forward end to the tractor, a first trailer connected to the rear of said body structure, a carrier having its front end overlying said first trailer and swivelly connected thereto, a second trailer supporting the rear of said carrier, a load bearing trestle supported by said tractor to swivel relative thereto, and projecting above said cab, and a load bearing trestle swivelly mounted on said carrier intermediately of said front and rear ends and projecting above said cab.

2. A long load vehicle comprising a tractor, a longitudinal body structure, said body structure being swivelled at its forward end to said tractor, a first trailer connected to the rear of said body structure, a carrier having its front end overlying said first trailer and swivelly connected thereto, a second trailer supporting the rear end of said carrier, front load bearing means supported by said tractor for swivel movement relative thereto, and a rear load bearing means swivelly mounted on said carrier intermediately of said front and rear ends.

3. A vehicle as claimed in claim 2 in which said body structure is formed of telescopically interfitting tube and bar means.

4. A vehicle as claimed in claim 2 in which said rear load bearing means is swivelly connected at a point overlying said first trailer.

5. A vehicle as claimed in claim 4 in which said second trailer is rigidly fixed to said carrier.

6. A vehicle as claimed in claim 5 in which said first trailer is rigidly fixed to said body structure.

7. A vehicle as claimed in claim 2 in which said first trailer comprises a three-axle trailer and said second trailer comprises a two-axle trailer and said rear load supporting means is swivelled at a point centrally of the width of said carrier and substantially overlying the last axle of said first trailer.

8. A vehicle as claimed in claim 7 in which means are provided to lock said first and second trailers in aligned relation.

9. A vehicle as claimed in claim 7 in which said tractor comprises a cab and a body portion rearwardly of said cab and said front load bearing means is disposed to overlie said tractor body portion.

10. A vehicle as claimed in claim 9 in which said front load bearing means is free to swivel with said longitudinal body structure.

11. A vehicle as claimed in claim 2 in which said front and rear load bearing means comprises trestles projecting above said tractor.

12. A long load vehicle comprising a tractor having a cab and a body portion rearwardly of said cab, a telescopic body structure swivelled at its forward end to said tractor body and supported at its rearward end by a three-axle wheeled structure, a carrier having its front end overlying said three-axle wheeled structure and connected for swivel movement relative thereto and having its rear end supported by a two-axle wheeled structure, front load bearing trestle means overlying said tractor body and mounted to swivel with said telescopic body structure and projecting above said cab, and rear load bearing trestle means swivelly mounted on said carrier with its point of swivel substantially overlying the last axle of said three-axle wheeled structure and projecting above said cab.

13. A long load vehicle comprising a tractor having a cab and a body portion rearwardly of said cab, a longitudinal trailer body swivelled at its forward end to the tractor body and supported at its rearward end by ground engaging wheels, a front trestle structure carried by and arranged to swivel relative to the tractor body and a rear trestle structure carried by and arranged to swivel relative to the trailer body, each of said trestles comprising a base normally extending transversely of the length of said vehicle and a platform supported from said base, said platform extending, with said base transverse of the vehicle length, fore and aft of the vehicle length to overhang said base on opposite sides thereof with said base disposed beneath and substantially midway between the width of said platform in a direction fore and aft of the vehicle, and diagonal bracing extending downwardly and inwardly from adjacent the front and rear of said platform to said base.

14. A long load vehicle comprising a tractor having a cab, a longitudinal body structure swivelled at its forward end to the tractor, ground engaging wheels supporting the rear of the body structure, and spaced trestle means for supporting a load above the cab of the tractor whereby a long load may be supported to overhang the tractor cab at the front and the trailer body at the rear, said spaced trestle means comprising a front trestle supported from said tractor for swivel movement relative thereto and having its axis of swivel coincident with the axis of swivel of said longitudinal body structure and a rear trestle supported from said ground engaging wheels for swivel movement relative to said body, said trestles each comprising a wide top braced by diagonal bracing extending diagonally downwardly from the front and rear of said wide top to the trestle base.

15. A long load vehicle comprising a tractor having a cab, a longitudinal body structure swivelled at its forward end to the tractor, ground engaging wheels supporting the rear of the body structure, and spaced trestle means for supporting a load above the cab of the tractor whereby a long load may be supported to overhang the tractor cab at the front and the trailer body at the rear, said spaced trestle means comprising a front trestle supported from said tractor for swivel movement relative thereto, and a rear trestle supported from said ground engaging wheels for swivel movement relative to said body, each of said trestle means being of a height greater than the height said cab extends above the tractor portion to which said longitudinal body structure is swivelled, and means bracing each trestle against shifting longitudinally of said body structure under load.

References Cited in the file of this patent

UNITED STATES PATENTS

| | | |
|---|---|---|
| 1,338,546 | Allen | Apr. 27, 1920 |
| 2,034,842 | Stratton | Mar. 24, 1936 |
| 2,360,654 | Day | Oct. 17, 1944 |
| 2,419,442 | Dorsey | Apr. 22, 1947 |
| 2,520,776 | Page | Aug. 29, 1950 |
| 2,683,584 | Selberg | July 13, 1954 |
| 2,900,198 | Patton | Aug. 18, 1959 |